US007329183B2

(12) United States Patent
Michaelson et al.

(10) Patent No.: US 7,329,183 B2
(45) Date of Patent: Feb. 12, 2008

(54) CENTRAL DETERMINATION GAMING SYSTEM WHERE THE SAME SEED IS USED TO GENERATE THE OUTCOMES FOR A PRIMARY GAME AND A SECONDARY GAME

(75) Inventors: Richard E. Michaelson, Reno, NV (US); Mark W. Bansemer, Reno, NV (US)

(73) Assignee: IGT, Reno, NV (US)

( * ) Notice: Subject to any disclaimer, the term of this patent is extended or adjusted under 35 U.S.C. 154(b) by 879 days.

(21) Appl. No.: 10/371,958

(22) Filed: Feb. 21, 2003

(65) Prior Publication Data

US 2004/0166923 A1 Aug. 26, 2004

(51) Int. Cl.
*A63F 13/00* (2006.01)
*A63F 9/24* (2006.01)

(52) U.S. Cl. ............................ 463/21; 463/16; 463/25; 463/29; 463/42

(58) Field of Classification Search .................... 463/1, 463/16–17, 22, 25, 29, 40–42; 273/138.1–2, 273/143 R See application file for complete search history.

(56) References Cited

U.S. PATENT DOCUMENTS 4,157,829 A 6/1979 Goldman et al.
4,332,389 A 6/1982 Loyd et al.
4,335,809 A 6/1982 Wain
4,339,798 A 7/1982 Hedges et al.
4,365,810 A 12/1982 Richardson
4,373,726 A 2/1983 Churchill et al.
4,448,419 A 5/1984 Telnaes
4,455,025 A 6/1984 Itkis
4,467,424 A 8/1984 Hedges et al.
4,494,197 A 1/1985 Troy et al.
4,527,798 A 7/1985 Siekierski et al.
4,582,324 A 4/1986 Koza et al.
4,624,462 A 11/1986 Itkis (Continued)

FOREIGN PATENT DOCUMENTS

GB 2 374 294 A 10/2002

(Continued)

OTHER PUBLICATIONS

Lucky Times California Lottery Newsletter published 1996.

(Continued)

*Primary Examiner*—Robert Pezzuto
*Assistant Examiner*—Ryan Hsu
(74) *Attorney, Agent, or Firm*—Bell Boyd & Lloyd LLP

(57) ABSTRACT

A central determination gaming system wherein the same random number or game play seed is used to generate a primary or base game outcome and a secondary or bonus game outcome. The present invention includes a central computing system in communication with a plurality of gaming devices. The central computing system maintains one or more predetermined pools or sets of random number or game play seeds. In one embodiment, each game play seed is deterministic of a primary wagering game outcome and a secondary game outcome. That is, each gaming device is operable to utilize a game play seed to determine both the primary wagering game outcome and the secondary game outcome.

33 Claims, 6 Drawing Sheets

U.S. PATENT DOCUMENTS

| | | | | |
|---|---|---|---|---|
| 4,636,951 | A | | 1/1987 | Harlick |
| 4,652,998 | A | | 3/1987 | Koza et al. |
| 4,669,730 | A | | 6/1987 | Small |
| 4,679,143 | A | | 7/1987 | Hagiwara |
| 4,689,742 | A | | 8/1987 | Troy et al. |
| 4,798,387 | A | | 1/1989 | Richardson |
| 4,805,907 | A | | 2/1989 | Hagiwara |
| 4,815,741 | A | | 3/1989 | Small |
| 4,817,951 | A | | 4/1989 | Crouch et al. |
| 4,842,278 | A | | 6/1989 | Markowicz |
| 4,848,771 | A | | 7/1989 | Richardson |
| 4,856,787 | A | | 8/1989 | Itkis |
| 4,880,237 | A | | 11/1989 | Kishishita |
| 4,882,473 | A | | 11/1989 | Bergeron et al. |
| 4,982,337 | A | | 1/1991 | Burr et al. |
| 5,007,649 | A | | 4/1991 | Richardson |
| 5,042,809 | A | | 8/1991 | Richardson |
| 5,092,598 | A | | 3/1992 | Kamille |
| 5,100,139 | A | | 3/1992 | Di Bella |
| 5,119,295 | A | | 6/1992 | Kapur |
| 5,158,293 | A | | 10/1992 | Mullins |
| 5,223,698 | A | | 6/1993 | Kapur |
| 5,265,874 | A | | 11/1993 | Dickinson et al. |
| 5,275,400 | A | | 1/1994 | Weingardt et al. |
| 5,276,312 | A | | 1/1994 | McCarthy |
| 5,282,620 | A | | 2/1994 | Keesee |
| 5,297,802 | A | | 3/1994 | Pocock et al. |
| 5,324,035 | A | | 6/1994 | Morris et al. |
| 5,326,104 | A | | 7/1994 | Pease et al. |
| 5,348,299 | A | | 9/1994 | Clapper, Jr. |
| 5,351,970 | A | | 10/1994 | Fioretti |
| 5,377,975 | A | | 1/1995 | Clapper, Jr. |
| 5,393,061 | A | | 2/1995 | Manship et al. |
| 5,398,932 | A | | 3/1995 | Eberhardt et al. |
| 5,407,199 | A | | 4/1995 | Gumina |
| 5,476,259 | A | | 12/1995 | Weingardt |
| 5,487,544 | A | | 1/1996 | Clapper, Jr. |
| 5,536,008 | A | | 7/1996 | Clapper, Jr. |
| 5,542,669 | A | | 8/1996 | Charron et al. |
| 5,562,284 | A | | 10/1996 | Stevens |
| 5,564,701 | A | | 10/1996 | Dettor |
| 5,580,311 | A | | 12/1996 | Haste, III |
| 5,586,937 | A | | 12/1996 | Menashe |
| 5,595,538 | A | | 1/1997 | Haste, III |
| 5,609,337 | A | | 3/1997 | Clapper, Jr. |
| 5,628,684 | A | | 5/1997 | Bouedec |
| 5,630,754 | A | | 5/1997 | Rebane |
| 5,645,485 | A | | 7/1997 | Clapper, Jr. |
| 5,657,899 | A | | 8/1997 | Stoken |
| 5,674,128 | A | | 10/1997 | Holch et al. |
| 5,697,843 | A | | 12/1997 | Manship et al. |
| 5,720,483 | A | | 2/1998 | Trinh |
| 5,735,432 | A | | 4/1998 | Stoken et al. |
| 5,749,784 | A | | 5/1998 | Clapper, Jr. |
| 5,779,545 | A | * | 7/1998 | Berg et al. .................... 463/22 |
| 5,779,547 | A | | 7/1998 | SoRelle et al. |
| 5,800,269 | A | | 9/1998 | Holch et al. |
| 5,810,664 | A | | 9/1998 | Clapper, Jr. |
| 5,830,067 | A | | 11/1998 | Graves et al. |
| 5,855,515 | A | | 1/1999 | Pease et al. |
| 5,871,398 | A | | 2/1999 | Schneier et al. |
| 5,876,283 | A | | 3/1999 | Parra et al. |
| 5,882,260 | A | | 3/1999 | Marks et al. |
| 5,915,588 | A | | 6/1999 | Stoken et al. |
| 5,928,082 | A | | 7/1999 | Clapper, Jr. |
| 5,941,771 | A | | 8/1999 | Haste, III |
| 5,944,606 | A | | 8/1999 | Gerow |
| 5,949,042 | A | | 9/1999 | Dietz, II et al. |
| 5,954,582 | A | | 9/1999 | Zach |
| 5,970,143 | A | | 10/1999 | Schneier et al. |
| 5,980,385 | A | | 11/1999 | Clapper, Jr. |
| 5,984,779 | A | | 11/1999 | Bridgeman et al. |
| 5,996,997 | A | * | 12/1999 | Kamille ...................... 273/139 |
| 6,012,984 | A | | 1/2000 | Roseman |
| 6,017,032 | A | | 1/2000 | Grippo et al. |
| 6,024,640 | A | | 2/2000 | Walker et al. |
| 6,030,288 | A | | 2/2000 | Davis et al. |
| 6,056,289 | A | | 5/2000 | Clapper, Jr. |
| 6,062,981 | A | | 5/2000 | Luciano, Jr. |
| 6,079,711 | A | | 6/2000 | Wei et al. |
| 6,089,982 | A | | 7/2000 | Holch et al. |
| 6,093,100 | A | | 7/2000 | Singer et al. |
| 6,099,408 | A | | 8/2000 | Schneier et al. |
| 6,117,009 | A | | 9/2000 | Yoseloff |
| 6,120,024 | A | | 9/2000 | Lind |
| 6,146,272 | A | | 11/2000 | Walker et al. |
| 6,155,925 | A | | 12/2000 | Giobbi et al. |
| 6,159,095 | A | | 12/2000 | Frohm et al. |
| 6,168,521 | B1 | | 1/2001 | Luciano et al. |
| 6,174,233 | B1 | | 1/2001 | Sunaga et al. |
| 6,183,361 | B1 | | 2/2001 | Cummings et al. |
| 6,210,275 | B1 | | 4/2001 | Olsen |
| 6,210,276 | B1 | | 4/2001 | Mullins |
| 6,217,448 | B1 | | 4/2001 | Olsen |
| 6,220,961 | B1 | | 4/2001 | Keane et al. |
| 6,241,606 | B1 | | 6/2001 | Riendeau et al. |
| 6,250,685 | B1 | | 6/2001 | Walker et al. |
| 6,254,480 | B1 | | 7/2001 | Zach |
| 6,273,820 | B1 | | 8/2001 | Haste, III |
| 6,280,325 | B1 | | 8/2001 | Fisk |
| 6,280,328 | B1 | | 8/2001 | Holch et al. |
| 6,302,791 | B1 | | 10/2001 | Frohm et al. |
| 6,306,038 | B1 | | 10/2001 | Graves et al. |
| 6,309,298 | B1 | * | 10/2001 | Gerow ........................ 463/20 |
| 6,315,289 | B1 | | 11/2001 | Sakamoto et al. |
| 6,325,716 | B1 | | 12/2001 | Walker et al. |
| 6,358,150 | B1 | | 3/2002 | Mir et al. |
| 6,358,151 | B1 | | 3/2002 | Enzminger et al. |
| 6,368,218 | B2 | | 4/2002 | Angell, Jr. |
| 6,386,977 | B1 | | 5/2002 | Hole |
| 6,402,614 | B1 | | 6/2002 | Schneier et al. |
| 6,419,583 | B1 | | 7/2002 | Crumby et al. |
| 6,443,837 | B1 | | 9/2002 | Jaffe et al. |
| 6,447,395 | B1 | | 9/2002 | Stevens |
| 6,450,885 | B2 | | 9/2002 | Schneier et al. |
| 6,454,648 | B1 | | 9/2002 | Kelly et al. |
| RE37,885 | E | | 10/2002 | Acres et al. |
| 6,471,591 | B1 | | 10/2002 | Crumby |
| 6,475,086 | B2 | | 11/2002 | Zach |
| 6,508,711 | B1 | | 1/2003 | Ono |
| 6,524,184 | B1 | | 2/2003 | Lind et al. |
| 6,524,185 | B2 | | 2/2003 | Lind |
| 6,527,638 | B1 | | 3/2003 | Walker et al. |
| 6,533,664 | B1 | | 3/2003 | Crumby |
| 6,537,150 | B1 | | 3/2003 | Luciano et al. |
| 6,569,017 | B2 | | 5/2003 | Enzminger et al. |
| 6,599,187 | B2 | | 7/2003 | Gerow |
| 6,656,040 | B1 | | 12/2003 | Brosnan et al. |
| 6,656,044 | B1 | | 12/2003 | Lewis |
| 6,729,961 | B1 | | 5/2004 | Millerschone |
| 6,749,500 | B1 | | 6/2004 | Nelson et al. |
| 6,749,510 | B2 | * | 6/2004 | Giobbi ........................ 463/42 |
| 2002/0010013 | A1 | | 1/2002 | Walker et al. |
| 2002/0039917 | A1 | | 4/2002 | Armstrong et al. |
| 2002/0072404 | A1 | | 6/2002 | Gerow |
| 2002/0077173 | A1 | | 6/2002 | Luciano et al. |
| 2002/0077174 | A1 | | 6/2002 | Luciano et al. |
| 2002/0082070 | A1 | | 6/2002 | Macke et al. |
| 2002/0082071 | A1 | | 6/2002 | Riendeau et al. |
| 2002/0082085 | A1 | | 6/2002 | Osterer |
| 2002/0090986 | A1 | | 7/2002 | Cote et al. |
| 2002/0094871 | A1 | | 7/2002 | Luciano et al. |
| 2002/0098882 | A1 | | 7/2002 | Lind et al. |
| 2002/0098883 | A1 | | 7/2002 | Packes, Jr. et al. |

| | | | |
|---|---|---|---|
| 2002/0111207 | A1 | 8/2002 | Lind et al. |
| 2002/0111214 | A1 | 8/2002 | Lind et al. |
| 2002/0113369 | A1 | 8/2002 | Weingardt |
| 2002/0132661 | A1 | 9/2002 | Lind et al. |
| 2002/0132666 | A1 | 9/2002 | Lind et al. |
| 2002/0169018 | A1 | 11/2002 | Schneier et al. |
| 2003/0100371 | A1 | 5/2003 | Gatto et al. |
| 2003/0100372 | A1 | 5/2003 | Gatto et al. |
| 2003/0125101 | A1 | 7/2003 | Campo |
| 2003/0181231 | A1 | 9/2003 | Vancura et al. |
| 2003/0193136 | A1 | 10/2003 | Walker et al. |
| 2003/0211884 | A1 | 11/2003 | Gauselmann |

FOREIGN PATENT DOCUMENTS

| | | | |
|---|---|---|---|
| WO | WO 98/35309 | * | 8/1998 |
| WO | WO 00/67424 | * | 11/2000 |
| WO | WO 02/97749 A2 | | 12/2002 |

OTHER PUBLICATIONS

Instant Winner Advertisement by Williams/WMS Gaming, published prior to 2002.

* cited by examiner

CENTRAL DETERMINATION GAMING SYSTEM WHERE THE SAME SEED IS USED TO GENERATE THE OUTCOMES FOR A PRIMARY GAME AND A SECONDARY GAME

CROSS-REFERENCE TO RELATED APPLICATIONS

This application relates to the following co-pending commonly owned patent applications: "GAMING SYSTEM WITH INDIVIDUALIZED CENTRALLY GENERATED RANDOM NUMBER GENERATOR SEEDS," Ser. No. 09/519,947, now U.S. Pat. No. 6,533.664; "GAMING DEVICE INCLUDING OUTCOME POOLS FOR PROVIDING GAME OUTCOMES," Ser. No. 10/261,744, "APPARATUS AND METHOD FOR GENERATING A POOL OF SEEDS FOR A CENTRAL DETERMINATION GAMING SYSTEM," Ser. No. 10/442,318, "CENTRAL DETERMINATION GAMING SYSTEM WITH A CENTRAL CONTROLLER PROVIDING A GAME OUTCOME AND A GAMING TERMINAL DETERMINING A PRESENTATION OF THE PROVIDED GAME OUTCOME," Ser. No. 10/371,723, "CENTRAL DETERMINATION GAMING SYSTEM WITH A GAME OUTCOME GENERATED BY A GAMING TERMINAL AND APPROVED BY A CENTRAL CONTROLLER," Ser. No. 10/383,423, "CENTRAL DETERMINATION GAMING SYSTEM WITH A GAMING TERMINAL ASSISTING THE CENTRAL CONTROLLER IN THE GENERATION OF A GAME OUTCOME," Ser. No. 10/431,755, and "CENTRAL DETERMINATION SYSTEM WITH A KENO GAME," Ser. No. 10/601,482.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a central determination gaming system, and more particularly to a central determination gaming system where the same game play seed is used to generate the outcomes for a primary game and a secondary game. The majority of the contemporary wagering gaming devices, such as slot machines, randomly generate awards and other outcomes. Such gaming devices typically include a relatively low probability associated with obtaining the highest award, relatively medium probabilities associated with obtaining medium range awards and relatively higher probabilities associated with obtaining low range awards. These gaming devices also include probabilities associated with obtaining losses or no award at all. The probabilities of obtaining the awards and the amount of the awards determine the average expected pay out percentage of these wagering gaming devices. Because the outcomes of these gaming devices are completely randomly determined, there is no certainty that a player will ever obtain any particular award. That is, no matter how many times a player plays the game, since the gaming device generates outcomes randomly or completely based upon a probability calculation, there is no certainty that the game will ever provide the player with a rare outcome, such as a jackpot award, or any other specific value for that matter. On the other hand, due to the random determination, the gaming device can provide the rare outcomes, such as jackpot awards, numerous times in a small number of plays. For example, a probability-based $1 slot machine gaming device may be programmed to payback 95% of all wagers placed with a 1% chance of generating a $10 win outcome, a 5% chance of generating a $5 win outcome, a 10% chance of generating a $2 win outcome, a 40% chance of generating a $1 win outcome and a 44% chance of generating a $0 loss outcome. However, when one hundred game outcomes are generated by the probability-based slot machine gaming device, the actual payback may be 137% of all wagers placed and the actual generated outcomes may be six $10 win outcomes, one $5 win outcome, eighteen $2 win outcomes, thirty-six $1 win outcomes and thirty-nine $0 loss outcomes.

This uncertainty is faced by players and casinos or other gaming establishments. For example, certain casinos prefer that a relatively high number of players hit low awards while a relatively low number of players hit high awards. When players hit high awards periodically, casinos attract more players, because of the positive publicity large wins generate. By using desired payback percentages or probabilities, the casinos can also expect to make a certain level of profit. The random determinations can, however, unexpectedly cause casinos to suffer a loss or, on the other hand, to reap great profit in the short run and lose business in the long run due to a reputation for only paying out low awards.

Regulatory bodies in certain jurisdictions do not permit the use of probability-based gaming devices in-part for these reasons. These regulatory bodies permit the use of wagering gaming devices which are guaranteed to provide certain or definite awards, so that, for example, a certain number of wins is guaranteed and the overall amount paid back to players is guaranteed. That is, the payback percentage is fixed and not an average expected amount. One type of gaming device which complies with this requirement is an instant-type lottery gaming device. An instant-type lottery gaming device includes a finite pool or set of electronic tickets with each electronic ticket assigned to a predetermined outcome. Alternatively, each electronic ticket could be assigned to a random number or game play seed. Each seed is deterministic of a predetermined primary game outcome. That is, the gaming device utilizes the random number or game play seed in a random number sequence generator to generate random numbers that the gaming device then uses to determine and provide the predetermined primary game outcome. In an instant-type lottery gaming device, as the predetermined outcome for each electronic ticket is revealed to a player on the gaming device, the ticket is removed (i.e., flagged as used) from the finite pool or set of electronic tickets. Once removed from the pool or set, a ticket cannot be used again to determine another game outcome. This type of gaming device provides players with all of the available outcomes over the course of the play cycle and guarantees the actual wins and losses.

Since an instant-type lottery gaming device has a finite pool of predetermined win/loss outcomes, it is possible to configure the pool to specific conditions or criteria requested by the casino or gaming establishment. An example of these conditions or criteria are the number of tickets included in the pool and the exact payback percentage or payback sum for the pool as a whole. The payback percentage or sum represents the guaranteed payout for the entire pool of predetermined outcomes. Other examples of conditions or criteria are what prizes will be awarded and the frequency of winning outcome tickets amongst the total number of tickets for the pool. For example, if a predetermined pool includes twenty $1 tickets and the pool has a payback sum of $10, then the pool might consist of one $5 win outcome, one $2 win outcome, three $1 win outcomes and fifteen $0 loss outcomes and may be represented as the following outcomes: 5, 2, 1, 1, 1, 0, 0, 0, 0, 0, 0, 0, 0, 0, 0, 0, 0, 0, 0, 0. It should be appreciated that the above described pool of twenty tickets is for illustration purposes only and a pool could include any suitable desired number of tickets including a large number such as one million or more.

Even though a pool may contain more than one of the same primary game outcome (i.e., the loss or the win and if a win, the value), the presentation to the player (such as reel stops in the case of slot machines or simulated slot machines, cards dealt or drawn in the case of simulated card games and the like) is preferably varied for each sequential primary game outcome. For example, in the twenty ticket pool described above, while three primary game outcomes may each determine a win primary game outcome with a value of $1, in a slot machine type game each primary game outcome will be preferably presented to the player as multiple different or all different winning combinations of reel symbols.

Additionally, central determination gaming systems are generally known. A central determination gaming system provides a plurality of individual gaming devices, located in a gaming establishment, such as a casino, coupled by one or more communication links, to a central processor or computing system. When a player plays a game on one of the gaming devices, the game outcome is communicated from the central system to the individual gaming device and then provided to the player. It should be appreciated that one central processor may continuously run hundreds or thousands of individual gaming devices at once.

In order to comply with the above mentioned regulatory rules that do not permit the use of probability-based gaming devices, central determination gaming systems have been implemented wherein the central system maintains one or more predetermined pools or sets of primary game outcomes. Additionally, certain central determination gaming systems have been implemented wherein the central system maintains one or more predetermined pools or sets of random number or game play seeds. The use of random number or game play seeds reduces the computational load on the central processor of the central determination gaming systems. In these systems, when a player makes a wager on one of the gaming devices, the central system selects a seed used for determining the primary game outcome, marks the selected seed as used and communicates the selected seed to that individual gaming device. The individual gaming device utilizes the seed to determine the predetermined primary game outcome. Once a seed is used, it is removed (or prevented from further selection) from the predetermined pool or set and cannot be selected by the central processor upon another wager.

There are a number of advantages to providing for centralized production seeds which are used for determining game outcomes at individual gaming devices. Central production or control can assist a casino or other entity in maintaining appropriate records, controlling gaming, reducing and preventing cheating or electronic or other errors, reducing or eliminating win-loss volatility and the like.

Additionally, gaming devices having a primary or base game and a secondary or a bonus game are also well known. A secondary or bonus game may be any type of suitable game, either similar to or completely different from the primary game, which is entered upon the occurrence of a triggering event or a selected outcome in the primary game. The secondary or bonus game enables the player to obtain a prize or payout in addition to the prize or payout, if any, obtained from the primary game. A secondary or bonus game produces a significantly higher level of player excitement than the primary game because it provides a greater expectation of winning than the primary game and is accompanied with more attractive or unusual features than the primary game.

SUMMARY OF THE INVENTION

The present invention relates to a central determination gaming system wherein the same random number or game play seed is used to generate a primary or base game outcome and a secondary or bonus game outcome. The present invention includes a central computing system in communication with a plurality of gaming devices. The central computing system maintains one or more predetermined pools or sets of random number or game play seeds. In one embodiment, each game play seed is deterministic of a primary wagering game outcome and a secondary game outcome. That is, each gaming device is operable to utilize a game play seed to determine both the primary wagering game outcome and the secondary game outcome.

In an alternative embodiment, each game play seed in a predetermined pool or set of game play seeds is deterministic of a primary wagering game outcome. Of these game play seeds, a plurality are also deterministic of a secondary game outcome. That is, each time a player initiates play at a gaming device, the gaming device enables the player to play a primary wagering game and obtain a primary wagering game outcome. A plurality of obtained primary wagering game outcomes will trigger a secondary game. If a secondary game is triggered, the gaming device enables the player to player the triggered secondary game and obtain a secondary game outcome. In this embodiment, each game play seed determines a primary wagering game outcome, but only the seeds that are deterministic of both a primary wagering game outcome and secondary game outcome enable a player to play and obtain outcomes in both a primary wagering game and a secondary game.

It should be appreciated that if any one or more than one designated gaming devices configured for playing a certain game receive the same specific seed, the resulting random numbers generated (and thus the resulting primary and secondary game outcomes) will always be the same even though the different gaming devices operate independently from one another. That is, if a plurality of the same gaming devices each run the same game play seed through a predefined random number generating algorithm, each of such same gaming devices will generate the same series of random numbers that correspond to the same game outcomes.

In one embodiment, a player initiates play of a primary wagering game at one of the gaming devices. The primary wagering game may be a casino-type game or any other desired wagering game. The gaming device requests a game play seed from the central computing system. In response to the request for a game play seed, the central computing system randomly selects a game play seed from the predetermined pool or set of game play seeds that is maintained by the central computing system. The central computing system marks the selected seed as used (preventing it from being selected again) and outputs or communicates the selected game play seed to the gaming device. The gaming device uses the outputted game play seed to generate at least one random number. The generated random number is utilized by the gaming device to determine a primary wagering game outcome. The primary wagering game outcome is either a win outcome with an associated prize or payout that triggers a secondary game, a win outcome with an associated prize or payout that does not trigger a secondary game, a lose outcome with no associated prize or payout that does not trigger a secondary game or a secondary game qualifying condition or triggering event outcome with no associated prize or payout in the primary wagering game.

If the primary wagering game outcome is a win outcome with an associated prize or payout that does not trigger a secondary game, the player is provided the associated prize or payout and the primary wagering game terminates. If the primary wagering game outcome is a lose outcome with no associated prize or payout that does not trigger a secondary game, the player is provided no prize or payout and the primary wagering game terminates.

If the primary wagering game outcome is or includes a secondary game triggering event (i.e., either a win outcome with an associated prize or payout that triggers a secondary game win or a secondary game qualifying or triggering outcome with no associated prize or payout in the primary wagering game), the gaming device initiates a secondary or bonus game. The secondary game may be a casino-type game or any other desired wagering game. In the secondary or bonus game, the gaming device utilizes the outputted game play seed to generate at least one secondary game or bonus random number. The generated secondary game or bonus random number is utilized by the gaming device to determine a secondary or bonus game outcome. The secondary game outcome may or may not be associated with a prize or payout. If the secondary or bonus game outcome is associated with a prize or payout, the prize or payout associated with the determined secondary or bonus game outcome is provided to the player and the secondary or bonus game terminates. It should be appreciated that the same game play seed that is used to determine the primary wagering game outcome is also used to determine the secondary game outcome.

In another embodiment, the secondary or bonus game outcome may be an additional secondary game qualifying condition or triggering event that initiates an additional secondary or bonus game. In this embodiment, the gaming device determines the additional secondary or bonus game outcome as described above using the same outputted game play seed that is used to determine the primary wagering game outcome and the initial secondary game outcome.

The present invention provides a number of advantages over existing central determination gaming systems. By utilizing the same seed to determine both the primary wagering game outcome and the secondary game outcome, the present invention requires the central computing system to maintain less game play seeds, thus reducing the computational load on the central computing system.

Additional features and advantages of the present invention are described in, and will be apparent from, the following Detailed Description of the Invention and the figures.

DETAILED DESCRIPTION OF THE INVENTION

Figure 1A:
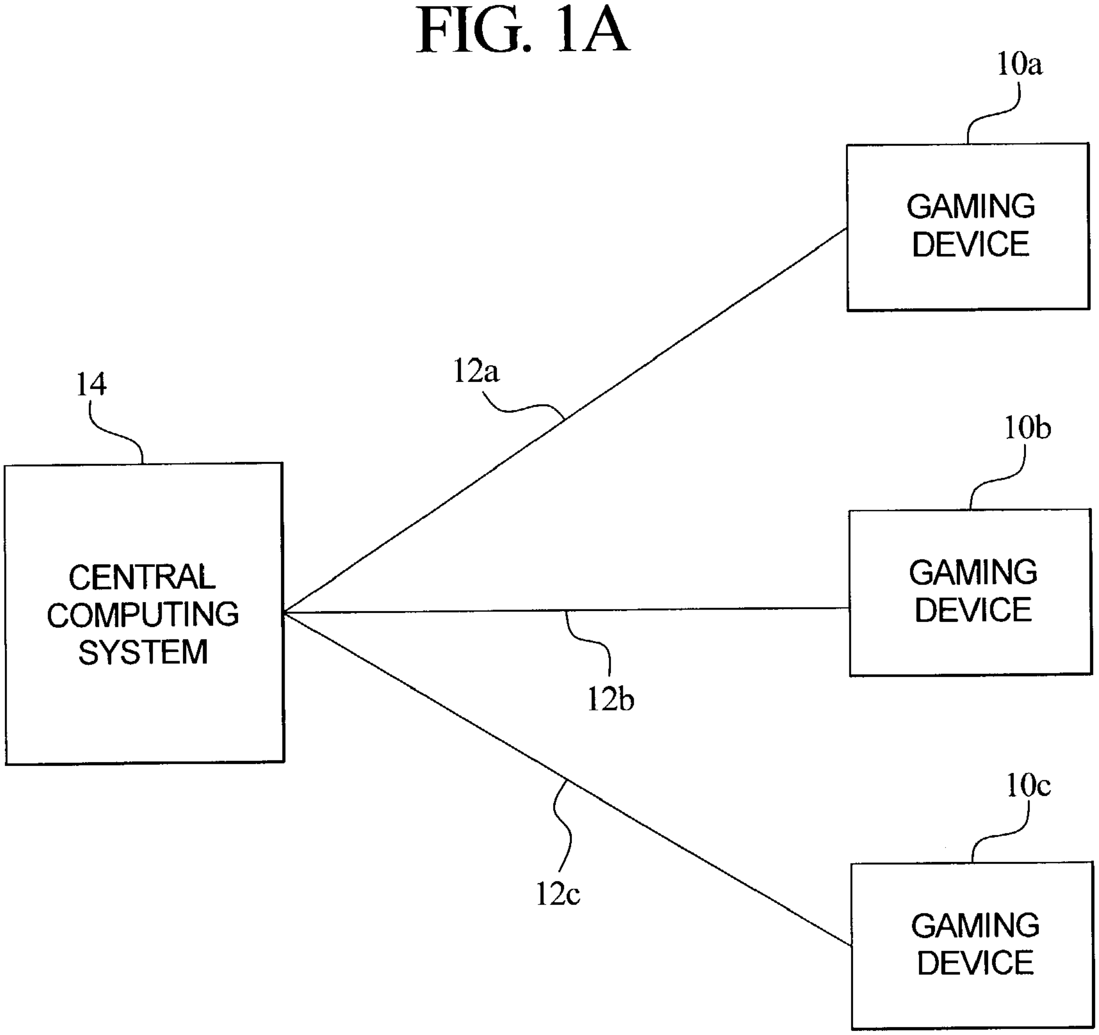
FIGS. 1A and 1B are schematic block diagrams illustrating the central controller and the individual gaming terminals in the central determination gaming system of the present invention.

Referring now to the drawings, as illustrated in FIG. 1A, one embodiment of the present invention includes a plurality of gaming devices 10*a*, 10*b* and 10*c* located in a gaming establishment, such as a casino, coupled by one or more communication links 12*a*, 12*b* and 12*c* to a central computing system 14. The communication links 12 can be any of a plurality of devices known to those of skill in the art for receiving data transmissions to and from the gaming device. The central computing system maintains supervision over the entire network of gaming devices.

In one embodiment, the central computing system 14 maintains at least one predetermined set or pool of predetermined game outcome seeds for each type of game provided on the gaming devices. In an alternative embodiment, the central computing system maintains a plurality of predetermined sets or pools of predetermined game outcome seeds for each type of provided game. In another embodiment, the central computing system maintains a predetermined set or pool of predetermined game outcome seeds for each denomination of each type of game provided on the gaming devices. Other methods for storing the pool or set of predetermined seeds may be employed in accordance with the present invention.

In one embodiment, each seed is deterministic of a primary or base game outcome and a secondary or bonus game outcome. That is, each seed is utilized to determine both a primary wagering game outcome and a secondary game outcome. Thus, for any given seed, it is possible to determine the primary wagering game outcome and the secondary game outcome that will result from that seed for a particular type of game.

In an alternative embodiment, each game play seed in a predetermined pool or set of game play seeds is deterministic of a primary wagering game outcome. Of these game play seeds, a plurality are also deterministic of a secondary game outcome. That is, each time a player initiates play at a gaming device, the gaming device enables the player to play a primary wagering game and obtain a primary wagering game outcome based on a game play seed. A plurality of obtained primary wagering game outcomes are also deterministic of secondary game outcomes and will trigger a secondary game. If a secondary game is triggered, the gaming device enables the player to player the triggered secondary game and obtain a secondary game outcome based on the same game play seed. In this embodiment, each game play seed determines a primary wagering game outcome, but only the seeds that are deterministic of both a primary wagering game outcome and secondary game outcome enable a player to play and obtain outcomes in both a primary wagering game and a secondary game.

A plurality of seeds in a set or pool of predetermined game play seeds are each deterministic of the same primary game outcome (not including whether the primary wagering game outcome triggers a secondary game or not). For example, if a pay table of a game indicates six different primary wagering game outcomes (i.e., a win $20 game outcome, a win $10 game outcome, a win $5 game outcome, a win $2 game outcome, a win $1 game outcome and lose game outcome), and the set or pool of game play seeds includes one-hundred thousand game play seeds, then a plurality of game play seeds will each be deterministic of the same primary wagering game outcome. In order to increase player entertainment, a plurality of the same primary wagering game outcomes are each presented or displayed to the player in a different way. For example, in a slot machine style gaming device, each of the same primary wagering game outcome is displayed or presented to the player as a different reel combination.

Figure 1B:
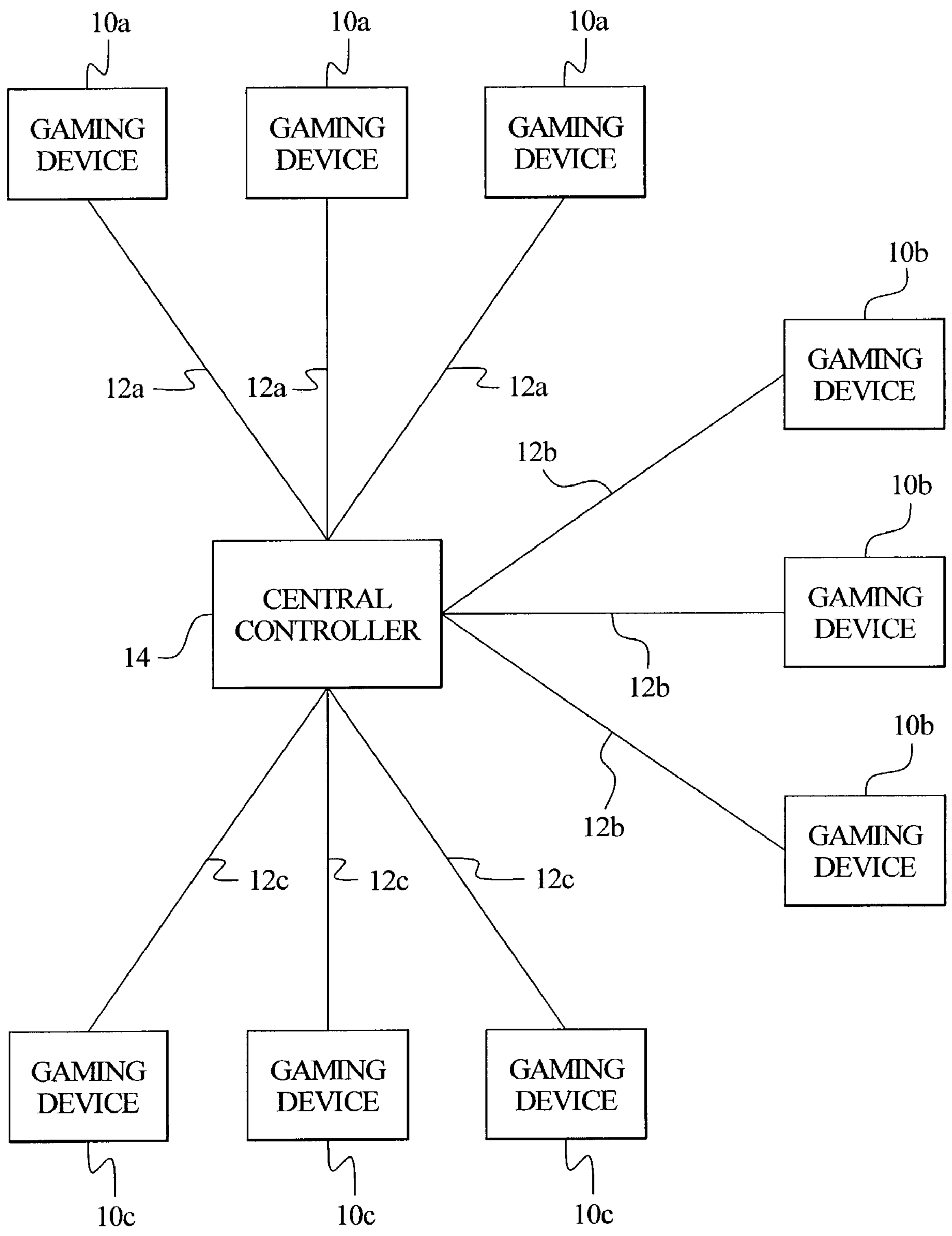

In one embodiment, all of the gaming devices which are coupled to the central computing system are configured to play the same type of game. In another embodiment, illustrated in FIG. 1B, a plurality of the gaming terminals are configured so that different gaming device or gaming terminals may be used to play different types of games. That is, the central controller 14 may be in communication via one of more communication links 12 with a plurality of gaming devices or gaming terminals 10*a* that are used for playing a slot machine style game, a different plurality of gaming devices or gaming terminals 10*b* that are used for playing a poker style game, a different plurality of gaming devices or gaming terminals 10*c* that are used for playing a blackjack style game, and the like. In an alternative embodiment, all of the gaming terminals which are coupled to the central processor are configured to play the same type of game. In another embodiment, a plurality of gaming terminals may each be configured for playing a plurality of different games. It should be appreciated that if any one or more than one designated gaming device configured for playing a certain game receive the same specific seed, the resulting random numbers generated (and thus the resulting primary and secondary game outcomes) will always be the same even though the different gaming devices operate independently from one another. That is, if a plurality of gaming devices each run the same game play seed through a predefined random number generating algorithm, each gaming device will generate the same series of random numbers that correspond to the same game outcomes.

Figure 2A:
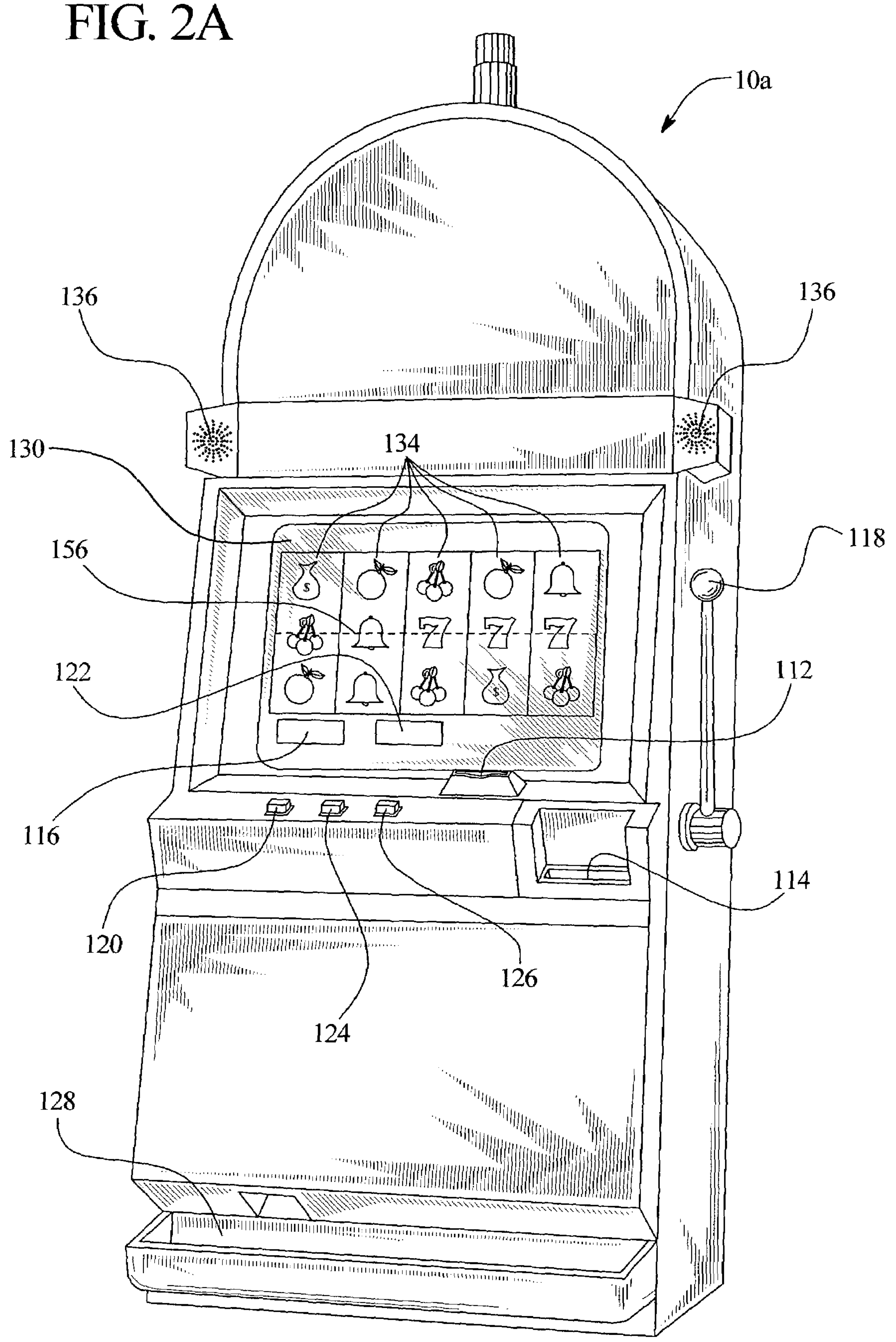
FIGS. 2A and 2B are perspective views of alternative embodiments of the gaming device of the present invention.
Figure 2B:
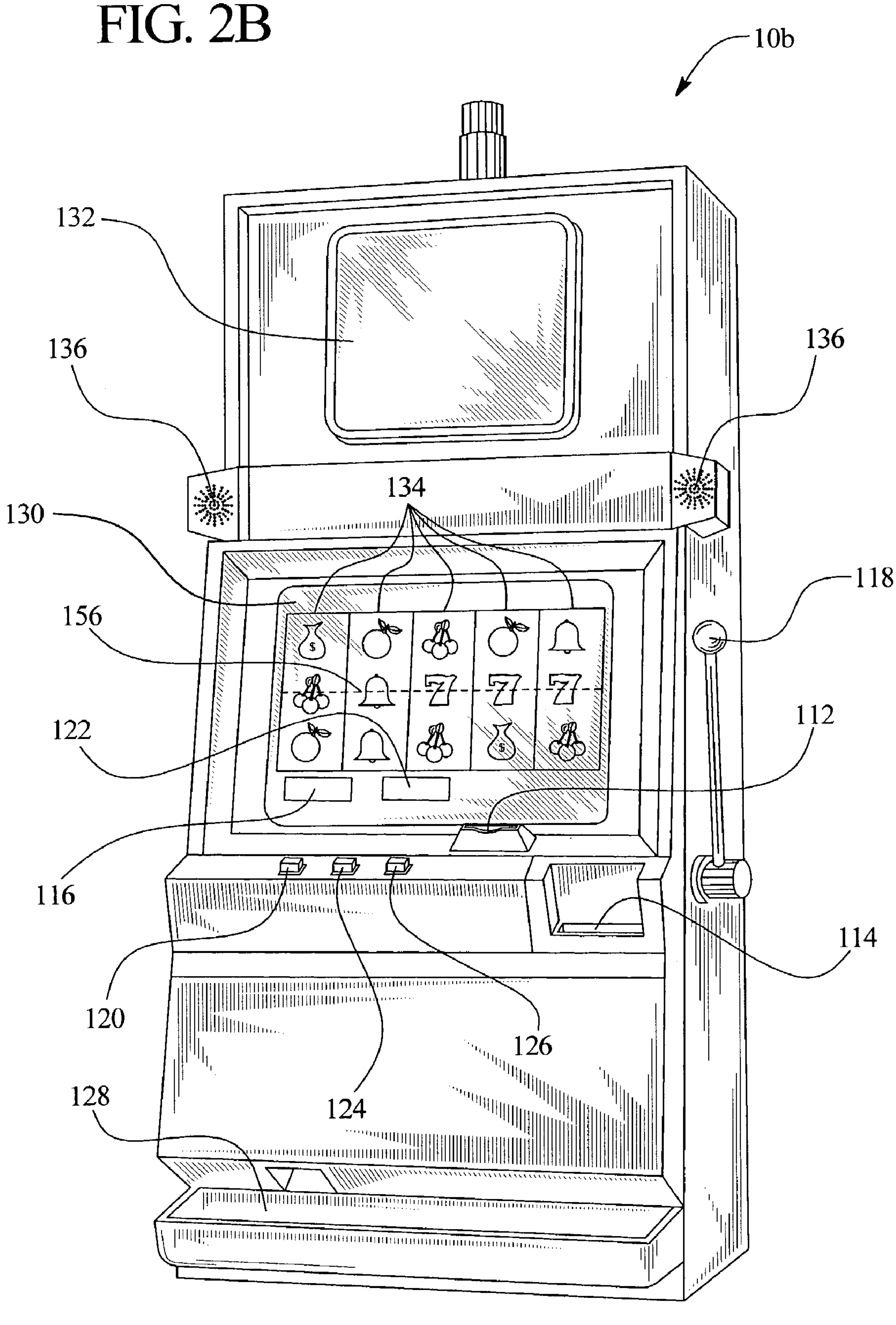

Two embodiments of the gaming device of the present invention are shown in FIGS. 2A and 2B as gaming device 10*a* and gaming device 10*b*, respectively. Gaming device 10*a* and/or gaming device 10*b* are generally referred to herein as gaming device 10. Gaming device 10 is in one embodiment a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 2A and 2B.

As illustrated in FIGS. 2A and 2B, gaming device 10 includes a coin slot 112 and bill acceptor 114 where the player inserts money, coins or tokens. The player can place coins in the coin slot 112 or paper money in the bill acceptor 114. Other devices could be used for accepting payment such as readers or validators for credit cards or debit cards. When a player inserts money in gaming device 10, a number of credits corresponding to the amount deposited is shown in a credit display 116. After depositing the appropriate amount of money, a player can begin the game by pulling arm 118 or pushing play button 120. Play button 120 can be any play activator used by the player which starts any game or sequence of events in the gaming device.

As shown in FIGS. 2A and 2B, gaming device 10 also includes a bet display 122 and a bet one button 124. The player places a bet by pushing the bet one button 124. The player can increase the bet by one credit each time the player pushes the bet one button 124. When the player pushes the bet one button 124, the number of credits shown in the credit display 116 decreases by one, and the number of credits shown in the bet display 122 increases by one.

A player may "cash out" and thereby receive a number of coins corresponding to the number of remaining credits by pushing a cash out button 126. When the player "cashes out," the player receives the coins in a coin payout tray 128. The gaming device 10 may employ other payout mechanisms such as credit slips redeemable by a cashier or electronically recordable cards which keep track of the player's credits.

Gaming device 10 also includes one or more display devices. The embodiment shown in FIG. 2A includes a central display device 130, and the alternative embodiment shown in FIG. 2B includes a central display device 130 as well as an upper display device 132. Gaming device 10 preferably displays a plurality of reels 134, preferably three to five reels 134 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 134 are in video form, the display device for the video reels 134 is preferably a video monitor. It should be appreciated that the present invention can include one or more paylines displayed in a horizontal and/or diagonal fashion.

Each reel 134 displays a plurality of indicia such as bells, hearts, fruits, numbers, letters, bars or other images which preferably correspond to a theme associated with the gaming device 10. The symbols and indicia used on and in gaming device 10 may be in mechanical, electronic, electrical or video form. Furthermore, gaming device 10 preferably includes speakers 136 for making sounds or playing music.

Figure 3:
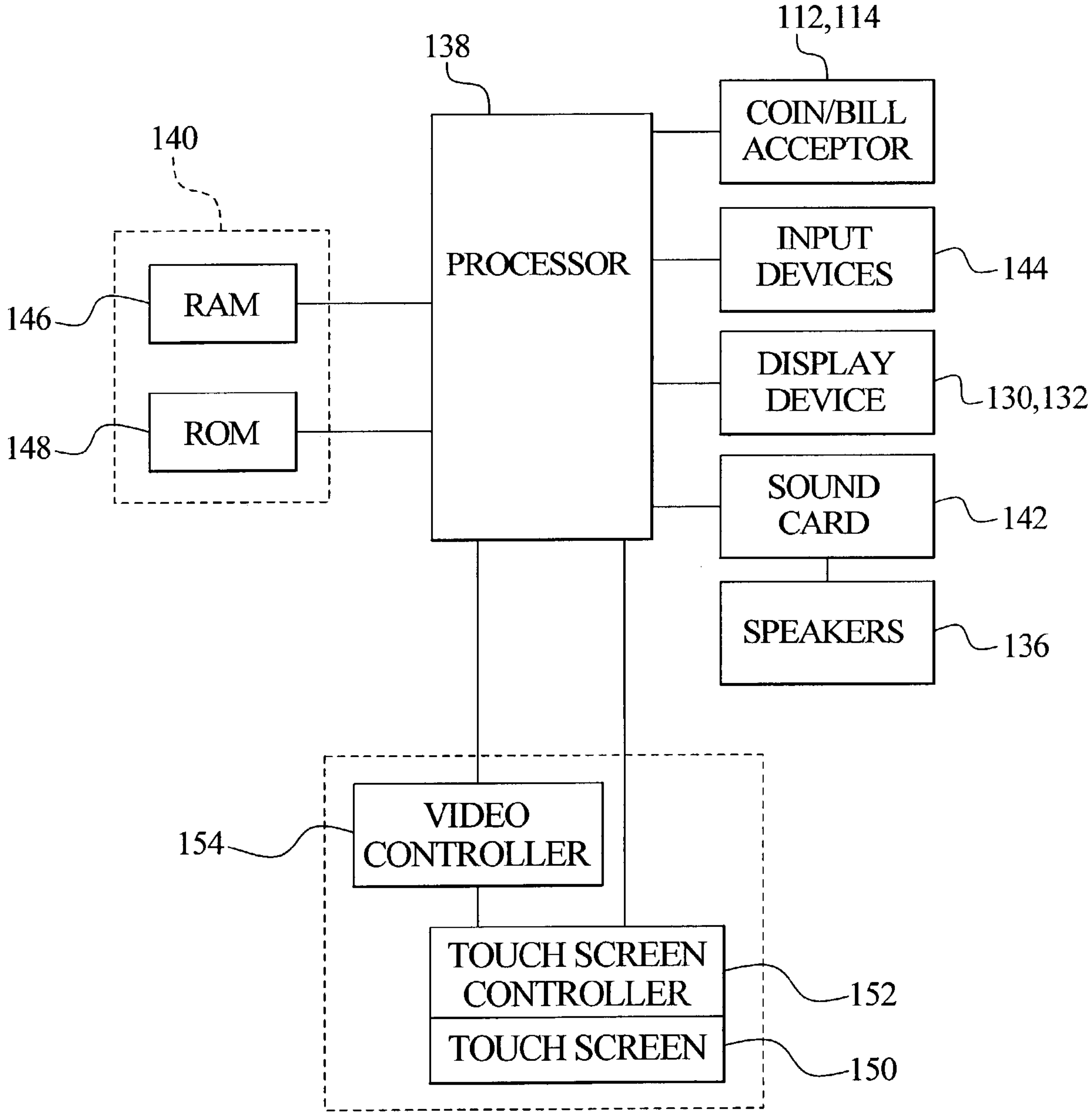
FIG. 3 is a schematic block diagram of an electronic configuration of one embodiment of the gaming device of the present invention.

As illustrated in FIG. 3, the general electronic configuration of gaming device 10 preferably includes: a processor 138; a memory device 140 for storing program code or other data; a central display device 130; an upper display device 132; a sound card 142; a plurality of speakers 136; and one or more input devices 144. The processor 138 is preferably a microprocessor or microcontroller-based platform which is capable of displaying images, symbols and other indicia such as images of people, characters, places, things and faces of cards. The memory device 140 can include random access memory (RAM) 146 for storing event data or other data generated or used during a particular game. The memory device 140 can also include read only memory (ROM) 148 for storing program code which controls the gaming device 10 so that it plays a particular game in accordance with applicable game rules and pay tables.

As illustrated in FIG. 3, the player preferably uses the input devices 144, such as pull arm 118, play button 120, the bet one button 124 and the cash out button 126 to input signals into gaming device 10. In certain instances it is preferable to use a touch screen 150 and an associated touch screen controller 152 instead of a conventional video monitor display device. Touch screen 150 and touch screen controller 152 are connected to a video controller 154 and processor 138. A player can make decisions and input signals into the gaming device 10 by touching touch screen 150 at the appropriate places. As further illustrated in FIG. 3, the processor 138 can be connected to coin slot 112 or bill acceptor 114. The processor 138 can be programmed to require a player to deposit a certain amount of money in order to start the game.

It should be appreciated that although a processor 138 and memory device 140 are preferable implementations of the present invention, the present invention can also be implemented using one or more application-specific integrated circuits (ASIC's) or other hard-wired devices, or using mechanical devices (collectively and/or alternatively referred to herein as a "processor"). Furthermore, although the processor 138 and memory device 140 preferably reside on each gaming device 10 unit, it is possible to provide some or all of their functions at a central location such as a network server for communication to a playing station such as over a local area network (LAN), wide area network (WAN), Internet connection, microwave link, and the like.

Figure 4:
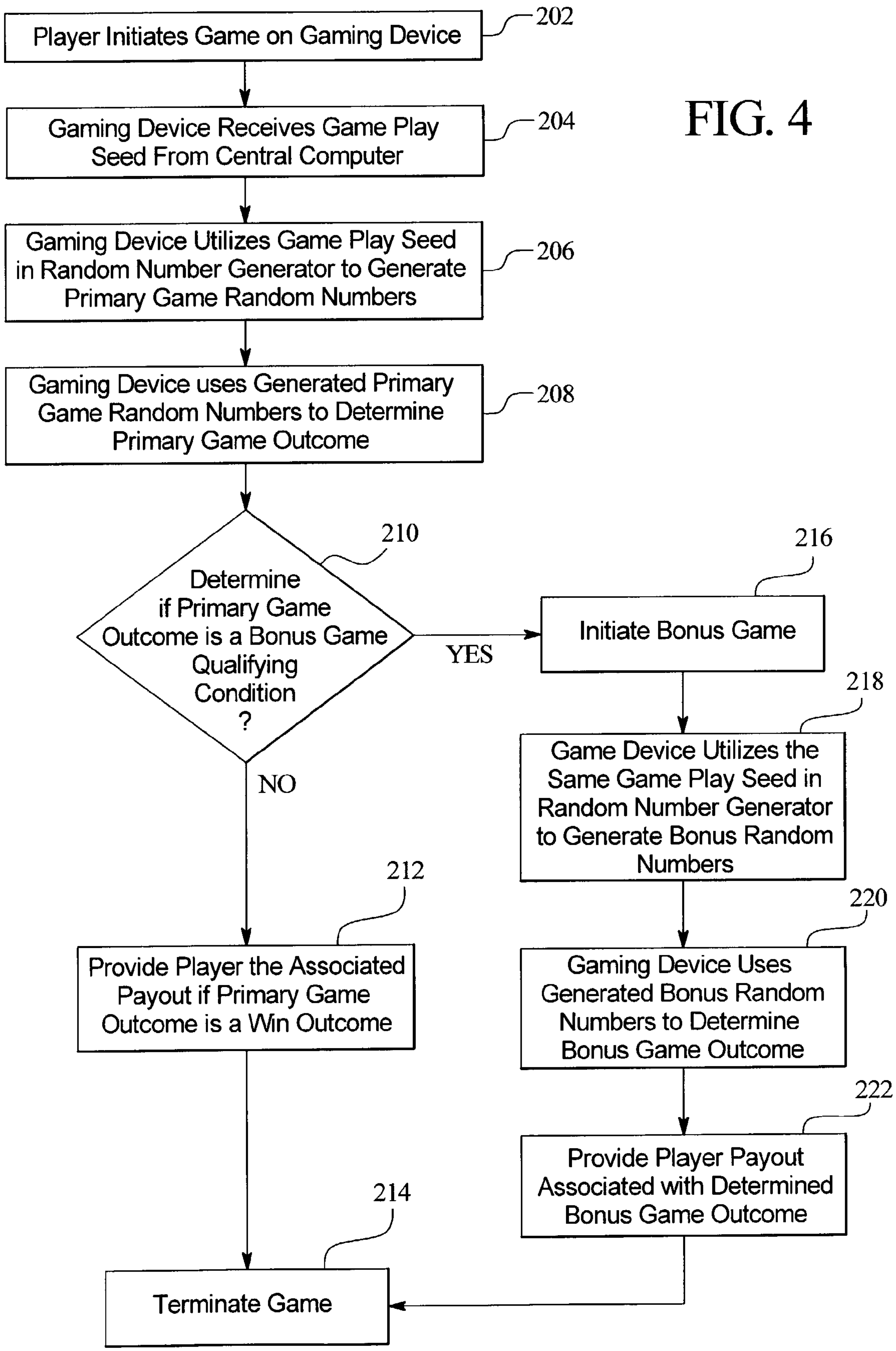
FIG. 4 is a schematic block diagram illustrating one embodiment of the present invention wherein the same game play seed is used to determine the primary wagering game outcome and the bonus game outcome.

With reference to FIG. 4, in one embodiment illustrating a slot machine style gaming device, to initiate operation of the gaming device the player must insert the appropriate amount of money or tokens and then pull the arm or push the play button as indicated in block 202 The reels will then begin to spin. As the wheels are spinning, the gaming device requests a game play seed from the central computing system of the central determination gaming system. In an alternative embodiment, the gaming device request a game play seed from the central computing system upon the player placing a wager in the gaming device.

Upon receiving a request for a game play seed, the central computing system selects a game play seed from the predetermined set or pool of predetermined game play seeds for the specific type of game played. The selected game play seed is communicated or outputted to the requesting gaming device as indicated in block 204. Once communicated or outputted to the requesting gaming device, the game play seed is marked or removed from the pool or set of predetermined seeds for the particular game played. Once a seed is marked or removed, it cannot be selected by the central computing system upon another wager. Other methods of sending a game play seed to the requesting individual gaming device may be employed in accordance with the present invention.

The processor of the gaming device uses the received game play seed in a random number generating algorithm to generate at least one random number as indicated in block 206. The generated random number is used to determine the primary game outcome as indicated in block 208. In one embodiment, the generated random number or a portion of the generated random number (i.e., the first four numbers after a decimal spot) is associated with a primary wagering game outcome. In this embodiment, the gaming device determines the primary wagering game outcome associated with the generated random number. In this embodiment, the processor of the gaming device proceeds to utilize at least one of the generated random numbers to determine a presentation of the determined primary wagering game outcome. That is, using at least one of the generated random numbers, the processor will determine how the determined primary wagering game outcome is displayed or presented to the player (i.e., for a slot machine gaming device, the specific reel combination that corresponds to the determined primary wagering game outcome).

In another embodiment, the processor of the gaming device generates a plurality of random numbers based on the received game play seed and uses a plurality of the generated random numbers to determine a primary wagering game outcome. For example, in a 3-reel slot machine style game, the processor may generate three random numbers. The first random number is used by the processor of the gaming device to determine the stop position of the first reel. The second random number is used by the processor to determine the stop position of the second reel. The third random number is used by the processor to determine the stop position of the third reel. The processor then compares the stopped reel combination to a pay table or other stored data to determine the primary wagering game outcome.

The primary wagering game outcome is either a win outcome with an associated prize or payout that triggers a secondary game, a win outcome with an associated prize or payout that does not trigger a secondary game, a lose outcome with no associated prize or payout that does not trigger a secondary game or a secondary game qualifying or triggering outcome that does trigger a secondary game with no associated primary wagering game prize or payout.

The processor of the gaming device determines if the primary wagering game outcome contains a secondary game qualifying condition or triggering event as indicated in diamond 210. If the primary wagering game outcome is a win outcome with an associated prize or payout that does not trigger a secondary game, the player is provided the associated prize or payout as indicated in block 212 and the primary wagering game terminates as indicated in block 214. If the primary wagering game outcome is a lose outcome with no associated prize or payout that does not trigger a secondary game, the player is provided no prize or payout and the primary wagering game terminates as indicated in block 214.

If the primary wagering game outcome contains a secondary game triggering event or qualifying condition (i.e., a win outcome with an associated prize or payout that triggers a secondary game or a secondary game qualifying condition or triggering event with no associated primary wagering game prize or payout), the gaming device initiates a secondary or bonus round as indicated in block 216. The secondary game qualifying condition or triggering event can be a particular arrangement of indicia on the reels or display device. The gaming device preferably uses a video-based central display device to enable the player to play the secondary or bonus round. In one embodiment, a plurality of different gaming devices that are coupled to the central computing system each provide a different secondary or bonus game. In another embodiment, each gaming device provides a plurality of different secondary or bonus games. In one embodiment, the secondary or bonus game is the same game as the primary or base game. In another embodiment, the secondary or bonus game is a different game than the primary or base game.

In the secondary or bonus game, the individual gaming device utilizes the same received game play seed to generate at least one secondary game or bonus random number as indicated in block 218. In an alternative embodiment, the gaming device utilizes the same received game play seed to generate a plurality of secondary game or bonus random numbers. In another embodiment, the gaming device does not generate additional seeds, but uses at least one or a plurality of the plurality of random number seeds that were generated to determine the primary wagering game outcome. It should be appreciated that if the processor of the gaming device initiates the play of a secondary or bonus game, the processor utilizes the same received game play seed to determine both the primary wagering game outcome and the secondary or bonus game outcome.

The gaming device uses the generated secondary game or bonus random number to determine the secondary or bonus game outcome as indicated in block 220 and as described above regarding the processor determining the primary wagering game outcome. In one embodiment, the secondary or bonus game outcome is a bonus or secondary game win outcome with an associated bonus prize or payout. In another embodiment, the secondary or bonus game outcome is either a secondary or bonus game win outcome with an associated bonus prize or payout or a secondary or bonus game lose outcome with no associated bonus prize or payout. The determined secondary or bonus game outcome, is provided to the player as indicated in block 222 and the game terminates as indicated in block 214. It should be appreciated that the processor of the gaming device may proceed to utilize at least one of the generated random numbers to determine a presentation of the determined secondary game outcome. That is, using at least one of the generated random numbers, the processor will determine how the determined secondary game outcome is displayed or presented to the player.

In an alternative embodiment, the secondary or bonus game outcome is an additional secondary or bonus game qualifying condition or triggering event. In this embodiment, the gaming device initiates an additional secondary or bonus game. It should be appreciated that the gaming device utilizes the same received game play seed that determined the primary wagering game outcome and the initial secondary game outcome to determine the additional secondary or bonus game outcome as described above.

It should be appreciated that regardless of how the game outcome is ultimately presented to the player, either as a prize or payout from the primary or base game, as a prize or payout from the secondary or bonus game, as a lose from the primary or base game or as a lose from the secondary or bonus game, the game outcome is predetermined. For example, if a particular game play seed in a $1 slot machine gaming device is deterministic of an outcome with an associated prize or payout of $10, the outcome may be presented to the player as a $10 win outcome in the primary or base game, a $10 secondary or bonus game win outcome or any combination of payouts in the primary or base game and secondary or bonus game that result in a total payout of $10. Either way, the player is provided $10 and that particular game play seed is removed from the set of seeds.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A central determination gaming system comprising:

a seed set, wherein said seed set includes a plurality of predetermined game play seeds; and a central computer operable to store said seed set, to randomly select a game play seed from said seed set, to prevent said selected game play seed in said seed set from further selection from said seed set, and to output said selected game play seed to at least one gaming device in communication with said central computer;

wherein said gaming device includes a processor operable to:

(a) enable a player to initiate a play of a primary wagering game, (b) receive said outputted game play seed, (c) determine and display a primary wagering game predetermined game outcome for the play of the primary game, said primary wagering game predetermined game outcome based on said outputted game play seed, (d) determine and display a secondary game predetermined game outcome for a play of a separate secondary game, said secondary game predetermined game outcome based on said outputted game play seed, and (e) provide said predetermined game outcomes to the player.

2. The central determination gaming system of claim 1, which includes a plurality of seed sets.

3. The central determination gaming system of claim 1, wherein a plurality of gaming devices are in communication with said central computer.

4. The central determination gaming system of claim 3, wherein said primary wagering games of at least two of said plurality of gaming devices are different.

5. The central determination gaming system of claim 1, wherein said central computer outputs a game play seed in response to a request for a game play seed from said gaming device.

6. The central determination gaming system of claim 1, wherein each game play seed is deterministic of a primary wagering game predetermined game outcome.

7. The central determination gaming system of claim 6, wherein a plurality of game play seeds are each deterministic of a secondary game predetermined game outcome.

8. The central determination gaming system of claim 1, wherein each game play seed is deterministic of both a primary wagering game predetermined game outcome and a secondary game predetermined game outcome.

9. The central determination gaming system of claim 1, wherein the processor of the gaming device is operable to generate a plurality of random numbers based on said outputted game play seed.

10. The central determination gaming system of claim 9, wherein the processor of the gaming device is operable to determine said primary wagering game predetermined game outcome based on at least one of said generated random numbers.

11. The central determination gaming system of claim 10, wherein the processor of the gaming device is operable to determine a presentation of said determined primary wagering game predetermined game outcome based on at least one of said generated random numbers.

12. The central determination gaming system of claim 9, wherein the processor of the gaming device is operable to determine said secondary game predetermined game outcome based on at least one of said generated random numbers.

13. The central determination gaming system of claim 12, wherein the processor of the gaming device is operable to determine a presentation of said determined secondary game predetermined game outcome based on at least one of said generated random numbers.

14. A central determination gaming system comprising:

a set of game play seeds, wherein said set includes a plurality of predetermined game play seeds and a plurality of said game play seeds are deterministic of a primary wagering game outcome and a secondary game outcome; and a central computer operable to randomly select a game play seed from said set of game play seeds, to prevent said selected game play seed from further selection from said set of game play seeds and to communicate said selected game play seed to at least one gaming device;

wherein said gaming device includes a processor operable to:

(a) enable a player to initiate a play of a primary wagering game, (b) receive said selected game play seed, (c) determine and display a primary wagering game predetermined game outcome for the play of said primary wagering game, said primary wagering game predetermined game outcome based on said selected game play seed, (d) initiate at least one play of a separate secondary game if said determined primary wagering game predetermined game outcome contains a secondary game triggering event, (e) determine and display a secondary game predetermined game outcome for the play of the secondary game, said secondary game predetermined game outcome based on said selected game play seed, and (f) provide the player said predetermined game outcomes.

15. The central determination gaming system of claim 14, wherein the processor of the gaming device is operable to initiate a plurality of plays of a plurality of separate secondary games if said determined primary wagering game predetermined game outcome contains a secondary game triggering event.

16. The central determination gaming system of claim 14, wherein the processor of the gaming device is operable to initiate at least one play of at least one additional secondary game if said determined secondary game predetermined game outcome contains a secondary game triggering event.

17. A gaming device comprising:

a primary wagering game operable upon a wager by a player;

a display device; and a processor in communication with said display device operable to:

(a) enable the player to initiate a play of the primary wagering game, (b) receive a game play seed from a central computing system, (c) determine and display a primary wagering game predetermined game outcome for said play of the primary wagering game, said primary wagering game predetermined game outcome based on said received game play seed, (d) determine and display a secondary game predetermined game outcome for a play of a separate secondary game, said secondary game predetermined game outcome based on said received game play seeds, and (e) provide said predetermined game outcomes to the player.

18. The gaming device of claim 17, wherein each game play seed is deterministic of a primary wagering game predetermined game outcome.

19. The gaming device of claim 18, wherein a plurality of received game play seeds are each deterministic of a secondary game predetermined game outcome.

20. The gaming device of claim 17, wherein each received game play seed is deterministic of both a primary wagering game predetermined game outcome and a secondary game predetermined game outcome.

21. A gaming device comprising:

a primary wagering game operable upon a wager by a player a display device; and a processor in communication with said display device operable to:

(a) enable the player to initiate a play of a primary wagering game, (b) receive a game play seed from central computing system, (c) determine and display a primary wagering game predetermined game outcome for the play of the primary wagering game, said primary wagering game predetermined game outcome based on said received game play seed, (d) initiate at least one play of a separate secondary game if said determined primary wagering game predetermined game outcome contains a secondary game triggering event, (e) determine and display a secondary game predetermined game outcome for the play of the secondary game, said secondary game predetermined game outcome based on said received game play seed, and (f) provide the player said predetermined game outcomes.

22. The gaming device of claim 21, wherein each game play seed is deterministic of a primary wagering game predetermined game outcome.

23. The gaming device of claim 22, wherein a plurality of received game play seeds are each deterministic of a secondary game predetermined game outcome.

24. The gaming device of claim 21, wherein each received game play seed is deterministic of both a primary wagering game predetermined game outcome and a secondary game predetermined game outcome.

25. A gaming device comprising:

a primary wagering game operable upon a wager by a player;

a display device; and a processor in communication with said display device operable to:

(a) enable the player to initiate a play of the primary wagering game, (b) receive a game play seed from a central computing system, (c) generate a plurality of random numbers based on said received game play seed, (d) determine and display a primary wagering game predetermined game outcome for said play of the primary wagering game, said primary wagering game predetermined game outcome based on at least one of said generated random numbers, (e) determine and display a secondary game predetermined game outcome for a play of a separate secondary game, said secondary game predetermined game outcome based on at least one of said generated random numbers, and (f) provide said predetermined game outcomes to the player.

26. The gaming device of claim 25, wherein the processor is operable to determine said primary wagering game predetermined game outcome for said play of said primary wagering game based on a plurality of said generated random numbers.

27. The gaming device of claim 25, wherein the processor is operable to determine said secondary game predetermined game outcome based on a plurality of said generated random numbers.

28. The gaming device of claim 25, wherein the processor is operable to determine a presentation of said determined primary wagering game predetermined game outcome based on at least one of said generated random numbers.

29. The gaming device of claim 25, wherein the processor is operable to determine a presentation of said determined primary wagering game predetermined game outcome based on a plurality of said generated random numbers.

30. The gaming device of claim 25, wherein the processor is operable to determine a presentation of said determined secondary game predetermined game outcome based on at least one of said generated random numbers.

31. The gaming device of claim 25, wherein the processor is operable to determine a presentation of said determined secondary game predetermined game outcome based on a plurality of said generated random numbers.

32. A method for operating a gaming device, said method comprising:

(a) enabling a player to initiate a play of a primary wagering game;

(b) receiving a game play seed from a central computing system;

(c) determining and displaying a primary wagering game predetermined game outcome for the play of the primary game, said primary wagering game predetermined game outcome based on said received game play seed;

(d) providing said primary wagering game predetermined game outcome to the player;

(e) determining and displaying a secondary game predetermined game outcome for a play of a separate secondary game, said secondary game predetermined game outcome based on said received game play seed, if said primary wagering game predetermined game outcome is a secondary game triggering event;

(f) providing said secondary game predetermined game outcome, if any, to the player; and (g) terminating said operation of said gaming device.

33. A method for operating a gaming device, said method comprising the steps of:

(a) enabling a player to initiate a play of a primary wagering game;

(b) receiving a game play seed from a central computing system;

(c) calculating a plurality of random numbers based on said received game play seed;

(d) determining and displaying a primary wagering game predetermined game outcome for the play of the primary game, said primary wagering game predetermined game outcome based on at least one of said calculated random numbers;

(e) providing said primary wagering game predetermined game outcome to the player;

(f) determining and displaying a secondary game predetermined game outcome for a play of a separate secondary game, said secondary game predetermined game outcome based on at least one of said calculated random number, if said primary wagering game predetermined game outcome is a secondary game triggering event;

(g) providing said secondary game predetermined game outcome, if any, to the player; and (h) terminating said operation of said gaming device.

* * * * *